US012443199B2

(12) United States Patent
Di et al.

(10) Patent No.: US 12,443,199 B2
(45) Date of Patent: Oct. 14, 2025

(54) POSITION-BASED CONTROL OF UNMANNED AERIAL VEHICLES

(71) Applicant: Skydio, Inc., San Mateo, CA (US)

(72) Inventors: Ruihui Di, Castro Valley, CA (US); Ashwani Arya, Encinitas, CA (US); Mehran Ferdowsi, Foster City, CA (US); Nirmit Kamalbhai Shah, San Jose, CA (US)

(73) Assignee: Skydio, Inc., San Mateo, CA (US)

( * ) Notice: Subject to any disclaimer, the term of this patent is extended or adjusted under 35 U.S.C. 154(b) by 67 days.

(21) Appl. No.: 17/392,428

(22) Filed: Aug. 3, 2021

(65) Prior Publication Data
US 2022/0019244 A1 Jan. 20, 2022

Related U.S. Application Data

(63) Continuation of application No. 15/915,630, filed on Mar. 8, 2018, now Pat. No. 11,099,581.
(Continued)

(51) Int. Cl.
*G05D 1/00* (2024.01)
*B64U 10/14* (2023.01)
(Continued)

(52) U.S. Cl.
CPC ............. *G05D 1/101* (2013.01); *B64U 10/14* (2023.01); *B64U 20/87* (2023.01); *G05D 1/0094* (2013.01); *G05D 1/102* (2013.01); *B64U 2101/30* (2023.01)

(58) Field of Classification Search
CPC ...... G05D 1/101; G05D 1/0094; G05D 1/102; B64C 39/024; B64C 19/00; B64C 27/08;
(Continued)

(56) References Cited

U.S. PATENT DOCUMENTS 6,735,542 B1 5/2004 Burgett
11,099,581 B2 8/2021 Di
(Continued)

OTHER PUBLICATIONS

X. Min, T. Qing, C. Liping, Z. Ruirui and X. Gang, "Research on relative height measurement based on multi-sensor fusion technology," 2017 2nd International Conference on Frontiers of Sensors Technologies (ICFST), Shenzhen, China, 2017, pp. 122-126, doi: 10.1109/ICFST.2017.8210487. (Year: 2017).*
(Continued)

Primary Examiner — Faris S Almatrahi
Assistant Examiner — Dana F Artimez
(74) Attorney, Agent, or Firm — Young Basile Hanlon & MacFarlane, P.C.

(57) ABSTRACT

The position of a UAV within a three-dimensional space is changed based on a change in position of a controller of the UAV. First and second sensor data are produced using sensors of the controller to maintain stable altitude output for the UAV. The first sensor data indicates a geolocation of the controller, and the second sensor data indicates a barometric pressure of an environment in which the controller is located. The first and second sensor data are post-processed using a complementary filter based on respective altitude measurements of the first and second sensor data to determine an altitude of the controller. A position of the controller is determined within a three-dimensional space based on the altitude. Data indicative of the position of the controller within the three-dimensional space is then transmitted to the UAV to cause a change in a position of the UAV within the three-dimensional space.

20 Claims, 8 Drawing Sheets

Related U.S. Application Data

(60) Provisional application No. 62/564,386, filed on Sep. 28, 2017.

(51) Int. Cl.
*B64U 20/87* (2023.01)
*B64U 101/30* (2023.01)

(58) Field of Classification Search
CPC ......... B64C 27/00; B64C 27/50; B64C 39/02; B64U 2101/30; B64U 2201/20; B64U 2201/10; B64U 10/10; B64U 30/20; B64U 10/13; B64U 2201/104; B64U 10/14; B64U 2101/00; B64U 2101/15; B64U 2101/20; B64U 2101/31; B64U 2101/35; B64U 2201/00; B64U 2201/102; B64U 50/19; B64U 70/00; B64U 70/30; B64U 20/87; G06T 7/246; H04W 4/029; H04W 4/025; G01P 13/00; G01S 13/882; G01S 19/42; G01S 2205/03; G01S 19/13
See application file for complete search history.

(56) References Cited

U.S. PATENT DOCUMENTS

| | | | |
|---|---|---|---|
| 2010/0204916 A1* | 8/2010 | Garin | G01S 19/45 701/532 |
| 2015/0205301 A1* | 7/2015 | Gilmore | G01S 19/13 701/11 |
| 2015/0309155 A1 | 10/2015 | Belloni | |
| 2015/0370250 A1* | 12/2015 | Bachrach | G05D 1/0027 701/2 |
| 2016/0304198 A1* | 10/2016 | Jourdan | G08G 5/0069 |
| 2016/0355198 A1 | 12/2016 | Dulmage | |
| 2017/0045892 A1* | 2/2017 | Wang | G05D 1/0077 |
| 2018/0039272 A1* | 2/2018 | Seydoux | G05D 1/0038 |
| 2018/0164801 A1 | 6/2018 | Kim | |
| 2018/0274919 A1 | 9/2018 | Pan | |
| 2019/0094887 A1 | 3/2019 | Di | |

OTHER PUBLICATIONS

Lim, A., Ramesh, B., Yang, Y et al. Real-time optical flow-based video stabilization for unmanned aerial vehicles. J Real-Time Image Proc 16, 1975-1985 2019 (Year: 2016).

* cited by examiner

POSITION-BASED CONTROL OF UNMANNED AERIAL VEHICLES

CROSS REFERENCE TO RELATED APPLICATION(S)

This application is a continuation of U.S. application Ser. No. 15/915,630, filed Mar. 8, 2018, which claims the benefit of U.S. Provisional Application No. 62/564,386, filed Sep. 28, 2017, the contents of which are incorporated by reference herein in their entirety.

TECHNICAL FIELD

This disclosure relates to position-based control of unmanned aerial vehicles (UAVs).

BACKGROUND

UAVs may be used for commercial and recreational purposes. A UAV may be controlled using a remote device, such as a controller. A user may interact with user interface elements of the controller to cause a change in one or more of a position, orientation, or motion of the UAV. In the context of aerial photography, a user of the controller can position the UAV to capture images or video of particular subjects within the environment in which the UAV operates.

SUMMARY

This disclosure describes, inter alia, systems and techniques for position-based control of UAVs.

One aspect of the disclosure is a method for controlling a UAV. The method includes producing first sensor data and second sensor data. The first sensor data indicates a geolocation of a controller of the unmanned aerial vehicle, and the second sensor data indicates a barometric pressure of an environment in which the controller is located. The method further includes filtering the first sensor data and the second sensor data based on a first altitude measurement of the first sensor data and a second altitude measurement of the second sensor data to determine an altitude of the controller. The method further includes determining a position of the controller within a three-dimensional space based on the altitude. The method further includes transmitting data indicative of the position of the controller within the three-dimensional space to the unmanned aerial vehicle to cause a change in a position of the unmanned aerial vehicle within the three-dimensional space.

Another aspect of the disclosure is a controller of a UAV. The controller includes a first sensor that produces first sensor data based on a geolocation of the controller. The controller further includes a second sensor that produces second sensor data based on a barometric pressure of an environment in which the controller is located. The controller further includes a sensor data filter mechanism that filters a first altitude measurement of the first sensor data and a second altitude measurement of the second sensor data to produce filtered sensor data. The controller further includes a position determination mechanism that determines a position of the controller within a three-dimensional space based on the filtered sensor data.

Another aspect of the disclosure is a non-transitory computer-readable storage medium comprising processor-executable routines that, when executed by a processor, facilitate a performance of operations for controlling a UAV. The operations include receiving, from a controller of the unmanned aerial vehicle, data indicative of a position of the controller within a three-dimensional space. The data reflects an altitude of the controller determined by filtering geolocation data and barometric data produced using sensors of the controller. The operations further include adjusting a position of the unmanned aerial vehicle within the three-dimensional space according to the data.

These and other aspects of this disclosure are disclosed in the following detailed description, the appended claims, and the accompanying figures.

BRIEF DESCRIPTION OF THE DRAWINGS

The disclosed implementations have other advantages and features that will be more readily apparent from the detailed description, the appended claims, and the accompanying figures. A brief introduction of the figures is below.

DETAILED DESCRIPTION

Figure 1A:
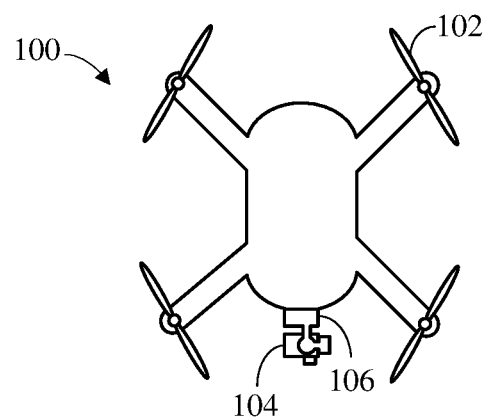
FIG. 1A shows an example of a UAV.

A UAV may include functionality for following a subject, such as for capturing image or video data of the subject. For example, the UAV may be configured to follow a particular person or item, such as a user of the UAV or a controller used to control the UAV. In some cases, the operations for following the person or item can include using geolocation data to adjust a latitudinal or longitudinal position of the UAV. However, the geolocation data alone may not be useful for accurately adjusting an altitude of the UAV. That is, because it is difficult to measure changes in altitude using typical geolocation systems (e.g., a global navigation satellite system (GNSS) device or component), such measurements may be subject to relatively high accuracy errors (e.g., ten to fifteen meters).

Other situations may also make it difficult to accurately measure changes in altitude using a geolocation system. For example, during operation of the UAV, the UAV may be moved into a location where it may be difficult to produce accurate geolocation data. For example, the UAV may be piloted from an open-sky environment to a forest or like environment with objects that block the sky from the UAV. A GNSS-based sensor, such as a GPS component, may have difficulty producing accurate sensor data once the UAV is moved into the forest, for example, because the foliage of the forest blocks measurements by the GNSS-based sensor.

In another example, weather-related changes (e.g., wind gusts) within the environment in which the UAV is operating or rapid motion by a user operating the UAV may affect accurate measurements by a GNSS-based sensor.

Implementations of this disclosure address problems such as these by combining geolocation data with other sensor data, such as barometric sensor data, for position-based control of a UAV. First and second sensor data are produced using sensors of the controller. The first sensor data indicates a geolocation of the controller, and the second sensor data indicates a barometric pressure of an environment in which the controller is located. The first and second sensor data are filtered based on respective altitude measurements of the first and second sensor data to determine an altitude of the controller. A position of the controller is determined within a three-dimensional space based on the altitude. Data indicative of the position of the controller within the three-dimensional space is then transmitted to the unmanned aerial vehicle to cause a change in a position of the unmanned aerial vehicle within the three-dimensional space.

By post-processing the first sensor data and the second sensor data (e.g., using a complementary filter, as will be described below), the first and second sensor data can be used to dynamically determine accurate altitude measurements for operating a UAV. That is, combining and post-processing geolocation data and barometric pressure data results in a reduced accuracy error for altitude measurements. The implementations of this disclosure further address reducing accuracy error based on user motion, such as by further filtering the first and/or second sensor data based on motion information measured using a motion-sensitive sensor within the controller. The implementations of this disclosure thus result in a more stable altitude for a UAV.

The implementations of this disclosure will now be described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

FIG. 1A shows an example of a UAV 100. In this implementation, the UAV 100 has a quad-copter configuration; that is, the UAV 100 includes four rotors 102. Each rotor 102 is driven by a separate electric motor (not shown). However, the UAV 100 may be another form of an aerial vehicle. A battery pack (not shown) mounted on or in a body of the UAV 100 may supply electrical power to all four electric motors, flight electronics (not shown) associated with operation of UAV 100, and an imaging device 104 that provides still and video images by means of a communication link (not shown) to a ground-based user. The imaging device 104 may be coupled to a front of the UAV 100 using, for example, a movement mechanism 106.

In FIG. 1A, the movement mechanism 106 removably mounts the imaging device 104 to the UAV 100. The implementation of the movement mechanism 106 shown in this example is a three-axis gimbal that permits the imaging device 104 to be rotated about three independent axes. However, the movement mechanism 106 may include another type of translational and/or rotational elements that permit rotational and/or translational movement in one, two, or three dimensions of the imaging device 104 in respect to the UAV 100.

Figure 1B:
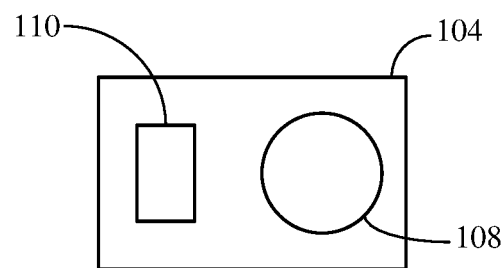
FIG. 1B shows an example of the imaging device associated with the UAV.

FIG. 1B shows an example of the imaging device 104 associated with the UAV 100. In FIG. 1B, the imaging device 104 is a GoPro Hero4® or Hero5® camera; however, other types of imaging device 104 that can be coupled to the UAV 100, for example, through use of the movement mechanism 106, may be utilized. The imaging device 104 may include still image and video capture capabilities. FIG. 1B shows a lens 108 of the imaging device 104 and a display screen 110 associated with the imaging device 104. Means for coupling the imaging device 104 to the UAV 100 and/or the movement mechanism 106 are not shown.

Figure 1C:
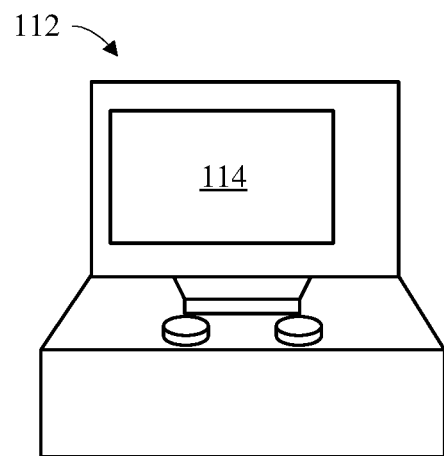
FIG. 1C shows an example of a controller associated with the UAV.

FIG. 1C shows an example of a controller 112. The controller 112 includes a user interface 114 for operating the UAV 100. The controller 112 may include a communications interface (not shown) via which the controller 112 may receive and send commands related to operation of the UAV 100, the imaging device 104, and the movement mechanism 106. The commands can include movement commands, configuration commands, operational control commands, and imaging commands. The controller 112 may be a remote control, a smartphone, a tablet computer, a phablet, a smart watch, a portable computer, and/or another device configured to receive user input and communicate information with the imaging device 104, the movement mechanism 106, and/or the UAV 100.

For example, the orientation and motion (e.g., flight direction, attitude, and altitude) of the UAV 100 may be controlled by controlling speeds of the motors that drive the respective rotors 102 of the UAV 100. During flight, a GPS receiver on the UAV 100 may provide navigational data to the controller 112 for use in determining flight paths and displaying the current location through the user interface 114. A vision-based navigation system that tracks visually significant features through image data captured by the imaging device 104 to provide the necessary speed and position of the UAV 100 to the controller 112 may also be implemented.

The communications interface may utilize a wireless interface configuration, for example, WiFi, Bluetooth (BT), cellular data link, ZigBee, near-field communications (NFC) link (e.g., using ISO/IEC 14443 protocol), ANT+ link, and/or other wireless communications link. In some implementations, the communications interface may be effectuated using a wired interface, for example, HDMI, USB, digital video interface, display port interface (e.g., digital display interface developed by the Video Electronics Standards Association (VESA), Ethernet, Thunderbolt), and/or other interface.

The controller 112 may operate a software application (e.g., GoPro Studio®, GoPro App®, and/or other application) configured to perform a variety of operations related to camera configuration, positioning of the movement mechanism 106, control of video acquisition, and/or display of video captured by the imaging device 104 through the user interface 114. For example, the software application may include functionality for using data produced by sensors of the controller 112 to determine a position of the controller 112 within a three-dimensional space. That software application may further include functionality for transmitting the determined position of the controller 112 to the UAV 100.

In another example, the software application may enable a user to create short video clips and share video clips to a cloud service (e.g., Instagram®, Facebook®, YouTube®, Dropbox®); perform full remote control of functions of the imaging device 104; live preview video being captured for shot framing; mark key moments while recording (e.g., HiLight Tag®, View HiLight Tags in GoPro Camera Roll®) for location and/or playback of video highlights; wirelessly control camera software; and/or perform other functions. Various methodologies may be utilized for configuring the imaging device 104 and/or displaying the captured information.

Figure 2:
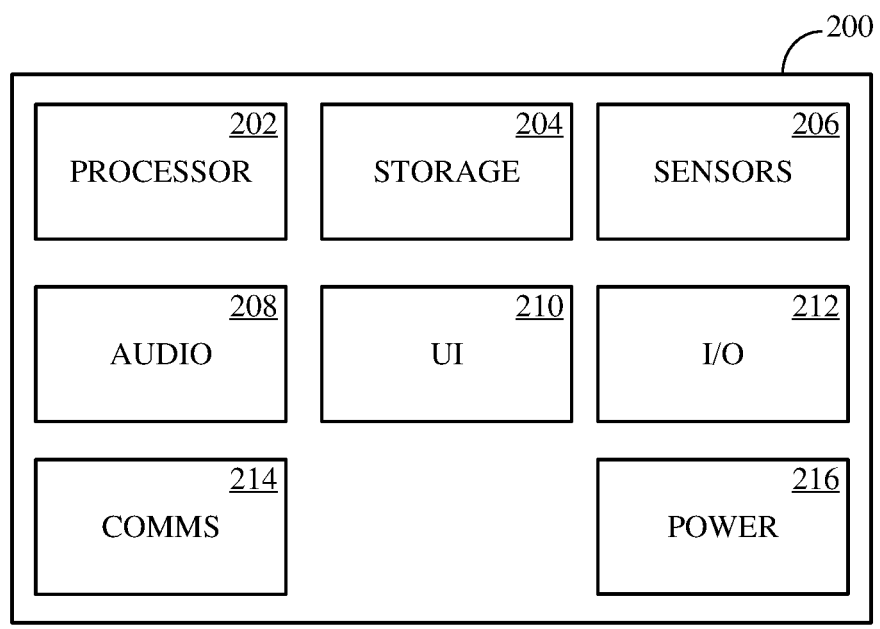
FIG. 2 is a block diagram illustrating components of a computing device.

FIG. 2 is a block diagram illustrating components of a computing device 200. The computing device 200 may be a single component of the UAV 100, the imaging device 104, the movement mechanism 106, or the controller 112. The computing device 200 may be multiple computing devices distributed in various ways between the UAV 100, the imaging device 104, the movement mechanism 106, or the controller 112. In the examples described, the computing device 200 may provide communication and control functions to the various components described in reference to FIGS. 1A, 1B, and 1C.

The computing device 200 may include a processor 202. The processor 202 may include a system on a chip (SoC), microcontroller, microprocessor, CPU, DSP, ASIC, GPU, or other processors that control the operation and functionality of the UAV 100, the imaging device 104, the movement mechanism 106, and/or the controller 112. The processor 202 may interface with mechanical, electrical, sensory, and power modules via driver interfaces and software abstraction layers. Additional processing and memory capacity may be used to support these processes. These components may be fully controlled by the processor 202. In some implementations, one or more components may be operable by one or more other control processes (e.g., a GPS receiver may include a processing apparatus configured to provide position and motion information to the processor 202 in accordance with a given schedule (e.g., values of latitude, longitude, and elevation at 10 Hz)).

The computing device 200 may also include electronic storage 204 in which configuration parameters, image data, and/or code for functional algorithms may be stored. The electronic storage 204 may include a system memory module that is configured to store executable computer instructions that, when executed by the processor 202, control various functions of the UAV 100, the imaging device 104, the movement mechanism 106, and/or the controller 112. The electronic storage 204 may also include storage memory configured to store content (e.g., metadata, frames, video, and audio) captured by the imaging device 104 or sensors associated with the UAV 100, the movement mechanism 106, and/or the controller 112.

The electronic storage 204 may include non-transitory memory configured to store configuration information and processing code configured to enable video information and metadata capture. The configuration information may include capture type (video, frames), image resolution, frame rate, burst setting, white balance, recording configuration (e.g., loop mode), audio track configuration, and other parameters that may be associated with audio, video, and metadata capture. Additional electronic storage 204 may be available for other hardware, firmware, or software needs of the UAV 100, the imaging device 104, the movement mechanism 106, and/or the controller 112. The memory and processing capacity may aid in the management of processing configuration (e.g., loading, replacement) operations during a startup and/or other operations.

The computing device 200 may include or be in communication with one or more sensors 206. The sensors 206 may include sensors associated with the UAV 100, the imaging device 104, and/or the movement mechanism 106. The sensors may, for example, include an inertial measurement unit (IMU), an accelerometer, a gyroscope, a barometer, a magnetometer, a compass, a LIDAR sensor, a global positioning satellite (GPS) receiver, an altimeter, an ambient light sensor, a temperature sensor, a pressure sensor, a heart rate sensor, a depth sensor (such as radar, an infrared-based depth sensor (e.g., a Kinect-style depth sensor), and a stereo depth sensor), and/or other sensors. The imaging device 104 may also provide sensors and associated metadata, for example, image sensors, a battery monitor, storage parameters, and other information related to camera operation and capture of content. The sensors 206 may obtain information related to an environment of the UAV 100 and aspects in which the content is captured.

By way of non-limiting example, an accelerometer may provide motion information including acceleration vectors from which velocity vectors may be derived, and a barometer may provide pressure information from which elevation may be derived. A gyroscope may provide orientation information, a GPS sensor may provide GPS coordinates and time for identifying location, and an altimeter may obtain altitude information. The sensors 206 may be rigidly coupled to the UAV 100, the imaging device 104, the movement mechanism 106, and/or the controller 112, such that the processor 202 may be operable to synchronize various types of data produced by various ones of the sensors 206.

For example, using timing information, metadata information produced by ones of the sensors 206 may be related to content (frame or video) captured by an image sensor. In some implementations, the metadata capture may be decoupled from the video or frame capture. That is, metadata may be stored before, after, and in-between one or more video clips or frames. In one or more implementations, the processor 202 may perform operations on the received metadata to generate additional metadata information. For example, the processor 202 may integrate received acceleration information to determine a velocity profile of the imaging device 104 during a recording of a video.

The computing device 200 may include or be in communication with audio sources 208, such as one or more microphones, configured to provide audio information that may be associated with images acquired by the imaging device 104 or commands provided by the controller 112. Two or more microphones may be combined to form a microphone system that is directional. Such a directional microphone system can be used to determine the location of a sound source and to eliminate undesirable noise originating in a particular direction. Various audio filters may be applied as well. In some implementations, audio information may be encoded using AAC, AC3, MP3, linear PCM, MPEG-H, and other audio coding formats (audio codec). In one or more implementations of spherical video and audio, the audio codec may include a 3-dimensional audio codec. For example, an Ambisonics codec can produce full surround audio including a height dimension. Using a G-format Ambionics codec, a special decoder may not be required.

The computing device 200 may include or be in communication with a user interface (UI) 210. The UI 210 may include a display configured to provide information related to operation modes (e.g., camera modes, flight modes), connection status (e.g., connected, wireless, wired), power modes (e.g., standby, sensor, video), data produced by the sensors 206 (e.g., heart rate, GPS, barometric), and/or other information associated with the UAV 100, the imaging device 104, the movement mechanism 106, and/or the controller 112. In some implementations, the UI 210 may include other devices capable of registering inputs from and communicating outputs to a user. These may include, without limitation, display, touch, gesture, proximity, light, sound receiving/emitting, wired/wireless, and/or other input/output devices. The UI 210 may include a display, one or more tactile elements (e.g., joysticks, switches, buttons, and/or virtual touchscreen buttons), lights (e.g., LED, LCD, or the like), speakers, and/or other interface elements.

The UI 210 may be configured to enable the user to provide commands to the UAV 100, the imaging device 104, and/or the movement mechanism 106. For example, the user interface 114 shown in FIG. 1C is one example of the UI 210. User commands provided using the UI 210 may be encoded using a variety of approaches, including but not limited to duration of a button press (pulse width modulation), number of button presses (pulse code modulation), or a combination thereof. For example, two short button presses through the UI 210 may initiate a sensor acquisition mode. In another example, a single short button press may be used to communicate (i) initiation of video or frame capture and cessation of video or frame capture (toggle mode) or (ii) video or frame capture for a given time duration or number of frames (burst capture). Other user command or communication implementations may also be realized, such as one or more short or long button presses or toggles of a joystick.

The computing device 200 may include an input/output (I/O) module 212. The I/O module 212 may be configured to synchronize the imaging device 104 with the controller 112, a second capture device, a smartphone, and/or a video server. The I/O module 212 may be configured to communicate information to and from various I/O components. The I/O module 212 may include a wired or wireless communications interface (e.g., Wi-Fi, Bluetooth, USB, HDMI, Wireless USB, Near Field Communication (NFC), Ethernet, a radio frequency transceiver, and other interfaces) configured to communicate to one or more external devices. The I/O module 212 may interface with LED lights, a display, a button, a microphone, speakers, and other I/O components. In one or more implementations, the I/O module 212 may be coupled to an energy source, such as a battery or other DC electrical source.

The computing device 200 may include a communication module 214 coupled to the I/O module 212. The communication module 214 may include a component (e.g., a dongle) having an infrared sensor, a radio frequency transceiver and antenna, an ultrasonic transducer, and/or other communications interfaces used to send and receive wireless communication signals. In some implementations, the communication module 214 may include a local (e.g., Bluetooth, Wi-Fi, or the like) or broad range (e.g., 3G, Long Term Evolution (LTE) or the like) communications interface configured to enable communications between the UAV 100, the imaging device 104, the movement mechanism 106, and/or the controller 112.

The communication module 214 may employ communication technologies including one or more of Ethernet, 802.11, worldwide interoperability for microwave access (WiMAX), 3G, LTE, digital subscriber line (DSL), asynchronous transfer mode (ATM), InfiniBand, PCI Express Advanced Switching, and/or other communication technologies. By way of non-limiting example, the communication module 214 may employ networking protocols including one or more of multiprotocol label switching (MPLS), transmission control protocol/Internet Protocol (TCP/IP), User Datagram Protocol (UDP), hypertext transport protocol (HTTP), simple mail transfer protocol (SMTP), file transfer protocol (FTP), and/or other networking protocols.

Information exchanged over the communication module 214 may be represented using formats including one or more of hypertext markup language (HTML), extensible markup language (XML), and/or other formats. One or more exchanges of information between the imaging device 104 and outside devices, such as the controller 112, may be encrypted using encryption technologies including one or more of secure sockets layer (SSL), transport layer security (TLS), virtual private networks (VPNs), Internet Protocol security (IPsec), and/or other encryption technologies.

The computing device 200 may include a power system 216 that may moderate a power supply based on the needs of the UAV 100, the imaging device 104, the movement mechanism 106, and/or the controller 112. For example, a battery, solar cell, inductive (contactless) power source, rectification, or other power supply housed within the UAV 100 may be controlled by the power system 216 to supply power for the imaging device 104 and/or the movement mechanism 106 when in a coupled state as shown in FIG. 1A.

Implementations of the computing device 200 may include additional, fewer, or different components than those shown in FIG. 2. In some implementations, the computing device 200 may include optics. For example, the optics may include a lens, such as the lens 108 shown in FIG. 1B. The lens may, for example, include a standard lens, macro lens, fisheye lens, zoom lens, special-purpose lens, telephoto lens, prime lens, achromatic lens, apochromatic lens, process lens, wide-angle lens, ultra-wide-angle lens, infrared lens, ultraviolet lens, perspective control lens, or the like.

In some implementations, the computing device 200 may include an image sensor. For example, the image sensor may be a charge-coupled device (CCD) sensor, active pixel sensor (APS), complementary metal-oxide semiconductor (CMOS) sensor, N-type metal-oxide-semiconductor (NMOS) sensor, or the like, or a combination thereof. The image sensor may be configured to capture light waves gathered by optics of the computing device 200 and generate image data based on control signals from a sensor controller. For example, the optics may include focus controller functionality configured to control the operation and configuration of a lens, such as for receiving light from an object and transmitting the received light to the image sensor. The image sensor may use the received light to generate an output signal conveying visual information regarding an object. For example, the visual information may include one or more of an image, a video, and other visual information.

In some implementations, the computing device 200 may be a first computing device included in the UAV 100 and another computing device 200 identical or similar to the computing device 200 may be a second computing device included in the controller 112. For example, the computing device 200 of the UAV 100 may include a first set of sensors 206 and the second computing device of the controller 112 may include a second set of sensors that are identical or similar to the sensors 206. As such, the controller 112 may include sensors used to produce data associated with the position, orientation, motion, or like aspects of the controller 112. The data produced using the sensors of the controller 112 is separate from data produced using the sensors 206, which instead is associated with the position, orientation, motion, or like aspects of the UAV 100.

Figure 3:
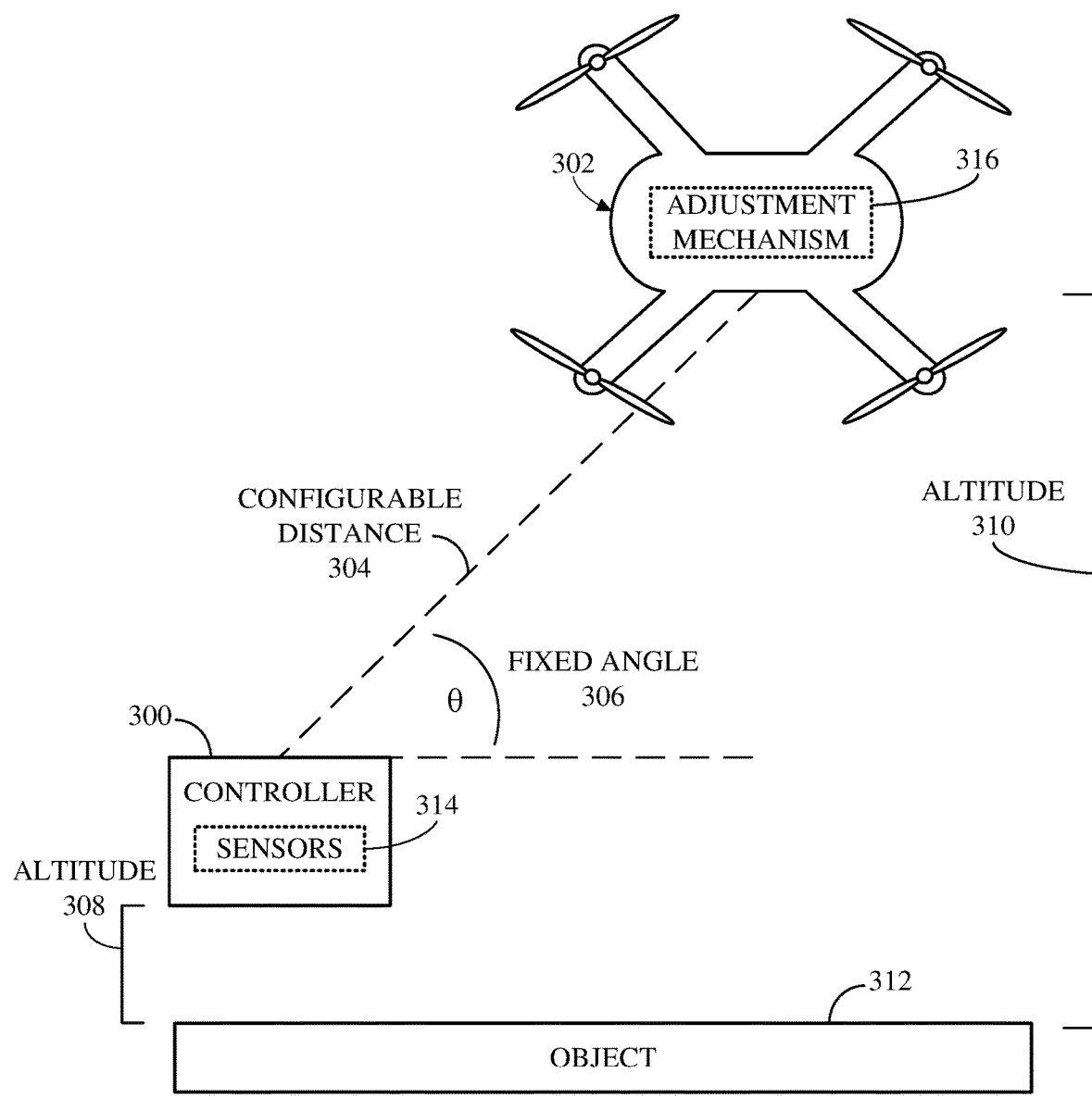
FIG. 3 shows an example of a relationship between a position of a controller of a UAV and a position of the UAV.

FIG. 3 shows an example of a relationship between a position of a controller 300 of a UAV 302 and a position of the UAV 302. The controller 300 may, for example, be the controller 112 shown in FIG. 1C. The UAV 302 may, for example, be the UAV 100 shown in FIG. 1A. The controller 300 is used to control the orientation and motion of the UAV 302, for example, a position of the UAV 302 in a three-dimensional space. In some cases, the position of the UAV 302 can be controlled through input received at the controller 300, such as by a user of the controller 300 toggling one or more user interface elements to adjust the position of the UAV 302. However, in at least some cases, the position of the UAV 302 may be controlled based on a position of the controller 300 within the three-dimensional space.

The UAV 302 follows the controller 300 such that, when a position of the controller 300 changes, a corresponding change may be made to the position of the UAV 302. There may be one or more defined operations for the UAV 302 to follow the controller 300. For example, a first follow operation may include the UAV 302 maintaining a configurable distance 304 to the controller 300 in a three-dimensional space. This first follow operation may further include maintaining a fixed angle 306 between the controller 300 and the UAV 302. The fixed angle 306 may correspond to the configurable distance 304. For example, the fixed angle 306 may reflect an angle relative to an altitude 308 of the controller 300, and an altitude 310 of the UAV 302.

While the UAV 302 maintains the configurable distance 304 and fixed angle 306, the UAV 302 may change orientation, such as through pitch, yaw, or roll. For example, the UAV 302 may include a camera or like image and/or video capture component (e.g., the imaging device 104 shown in FIG. 1B). The UAV 302 can yaw about one axis and pitch about another, such as to keep the imaging device focused on a particular object or subject.

In another example, a second follow operation may include not adjusting a position of the UAV 302 until the configurable distance 304 is met. For example, a change in position of the controller 300 may not result in a change in position of the UAV 302 where the UAV 302 is less than the configurable distance 304 from the controller 300. However, if a change in position of the controller 300 causes the UAV 302 to be equal to or be greater than the configurable distance from the controller 300, the position of the UAV 302 may then be adjusted. The UAV 302 may still change orientation, such as through pitch, yaw, or roll, while in the second follow operation. There may be further or different follow operations used between the controller 300 and the UAV 302 than the first and second follow operations described above.

The altitudes 308 and 310 are with respect to an object 312 below the controller 300. The object 312 is an object over which the UAV 302 can be operated. For example, the object 312 can be an outdoor element (e.g., a portion of ground, earth, rock, or the like; a topographical phenomenon, such as a hill or bluff; a building or other structure; or the like) or an indoor element (e.g., a portion of floor, stairs, or the like). The altitude 308 reflects a distance between the controller 300 and the object 312, such as along a Y-axis within a three-dimensional space. The altitude 310 reflects a distance between the UAV 302 and the object 312, such as along the Y-axis within the three-dimensional space.

The position of the controller 300 can be determined using sensor data produced using one or more sensors 314 at the controller 300. The sensors 314 may, for example, be the sensors 206 shown in FIG. 2. That is, the sensors 314 may include a barometer, a thermometer, an inertial motion unit (e.g., a gyroscope, an accelerometer, a magnetometer, or the like), a geolocation sensor (e.g., a GNSS-based sensor, for example, GPS, GLONASS, or Galileo), or the like, or a combination thereof.

The controller 300 may include a processor configured to execute instructions for determining the position of the controller 300 in the three-dimensional space based on the sensor data produced by ones of the sensors 314. For example, the position of the controller 300 may be determined by executing instructions to filter and combine sensor data produced using a GNSS-based sensor of the sensors 314 and a barometer of the sensors 314. Examples of techniques for determining the position of the controller 300 using sensor data are described below with respect to FIG. 4.

The position of the controller 300 may then be communicated to the UAV 302, for example, by the controller 300 transmitting packetized data indicative of the position of the controller 300 to the UAV 302 over Wi-Fi. The UAV 302 includes an adjustment mechanism 316 that processes the data received from the controller 300 to determine whether and by how much to adjust a position of the UAV 302 based on the received data. Examples of techniques for adjusting a position of the UAV 302 based on the position of the controller 300 are described below with respect to FIG. 5.

Figure 4:
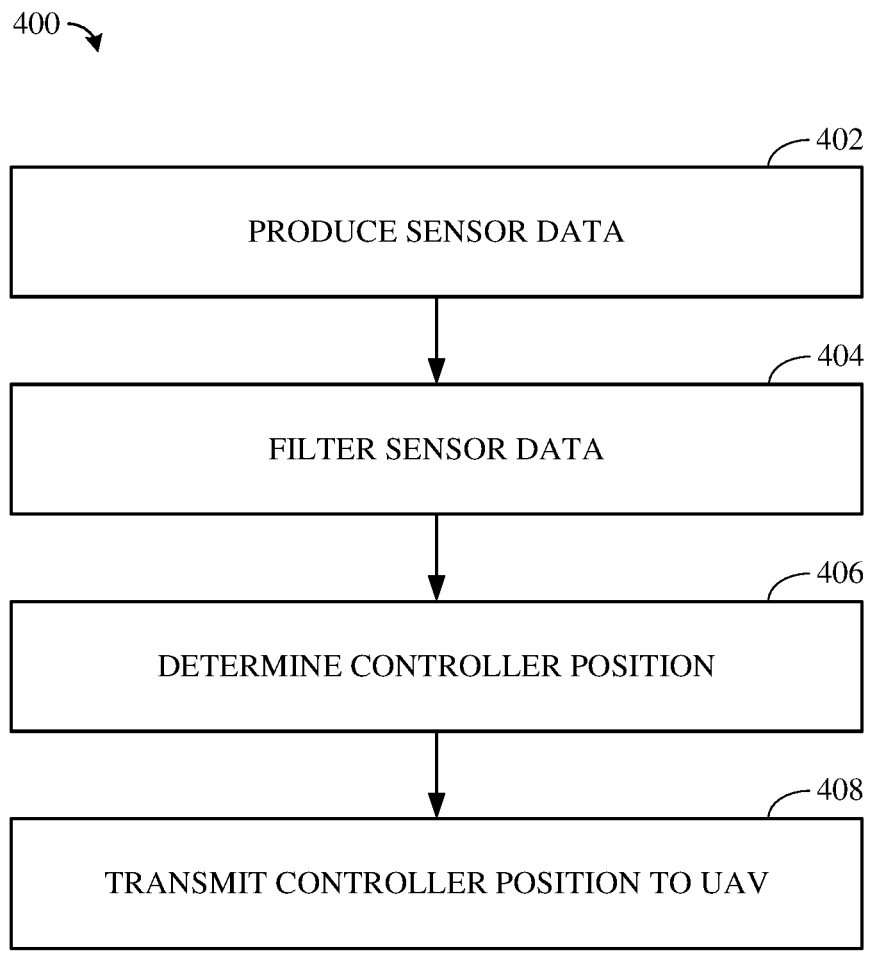
FIG. 4 is a flowchart showing an example of a technique for position-based control of a UAV performed at a controller.

FIG. 4 is a flowchart showing an example of a technique 400 for position-based control of a UAV performed at a controller. The technique 400 can be performed, for example, using hardware and/or software components of a controller of a UAV, such as the controller 300 shown in FIG. 3. Although the technique 400 is described with respect to a series of operations, the operations comprising the technique 400 may be performed in orders other than those described herein. In some implementations, the technique 400 may include additional, fewer, or different operations than those described herein.

At 402, sensor data is produced using one or more sensors of a controller of a UAV (e.g., the controller 300 and the UAV 302 shown in FIG. 3). The sensors may produce the sensor data by measuring aspects of the controller, the environment in which the controller is located, or the like. In some cases, and for example, some or all of the sensor data may reflect a temperature of the controller, such as may be measured using a thermometer within the controller. In another example, some or all of the sensor data may reflect a position of the controller, such as may be measured using a GNSS-based sensor (e.g., a GPS component within the controller). As such, portions of the sensor data may be produced using different sensors.

The sensor data produced at 402 includes first sensor data produced using a GNSS-based sensor and second sensor data produced using a barometer. The first sensor data and the second sensor data can be processed to determine a position of the controller within a three-dimensional space. The first sensor data produced using the GNSS-based sensor may indicate a geolocation of the controller. However, a value of the first sensor data reflecting an altitude of the controller may not be stable due to a relatively high variation error (e.g., five to ten meters), such that the value of the first sensor data reflecting the altitude of the controller may not be usable to determine the altitude of the controller.

Alternatively, the first sensor data may indicate the position of the controller within a two-dimensional space (e.g., based on latitudinal and longitudinal coordinates of the controller), but not an altitude of the controller (e.g., because the altitude otherwise indicated by the first sensor data is subject to a large accuracy error). In some cases, however, the quality of the value of the first sensor data reflecting the altitude of the controller may be indicated by a horizontal position error of the GNSS-based sensor.

In contrast, the second sensor data produced using the barometer indicates a barometric pressure of an environment in which the controller is located. For example, the second sensor data may reflect a barometric pressure that, when referenced against known barometric pressures at altitudes, indicates an altitude of the controller. The second sensor data has a relatively low variation error (e.g., two meters). The second sensor data may thus reflect a more accurate altitude measurement for the controller.

At 404, the sensor data produced using ones of the sensors of the controller are filtered. Filtering the sensor data can include processing the sensor data to remove noise, outliers, or the like, or a combination thereof. The filtering may be performed using one or more filters, for example, an extended Kalman filter. Ones of the filters may be applied individually to the first sensor data and the second sensor data. Alternatively, the filters may be applied to the first sensor data and the second sensor data.

For example, the first sensor data can be filtered based on third sensor data, for example, produced using an IMU or like sensor of the controller. The IMU or like sensor may, for example, detect motion of the controller, such as based on an acceleration or deceleration of the controller caused by a human user moving the controller. The detected motion can be filtered from the first sensor data to result in a more accurate position of the controller, as may be indicated by data produced using the GNSS-based sensor.

In another example, the second sensor data can be filtered using a low pass filter with a moving window of a defined length (e.g., ten seconds). The low pass filter can reduce the already relatively low variation error of raw barometric data (e.g., the second sensor data) to one meter or less. The low pass filter thus smooths the raw second sensor data to improve the accuracy thereof. In yet another example, a complementary filter can be used to fuse aspects of the first sensor data and the second sensor data. For example, because the altitude measurements of the first sensor data may be less accurate than the altitude measurements of the second sensor data, the first sensor data may be used as a reference by which to process the second sensor data.

The first sensor data and the second sensor data may be filtered based on a first altitude measurement of the first sensor data and a second altitude measurement of the second sensor data to determine an altitude of the controller. The filtering may be performed using a complementary filter that combines the filtered first sensor data produced using the GNSS-based sensor with the filtered second sensor data produced using the barometer. For example, combining the filtered first sensor data with the filtered second sensor data may include fusing the filtered first sensor data and the filtered second sensor data according to a complementary filter. Examples for filtering the first sensor data and the second sensor data using a complementary filter are described below with respect to FIG. 5.

The low-pass filter used to smooth the second sensor data may in some cases cause a delay in processing the altitude of the controller as compared to the real-time activity of a user of the controller. For example, when the controller moves in only a horizontal direction, the altitude of the controller does not change, and there may thus not be a delay in processing, such as because the low pass filter may not be used. However, when the controller moves in a vertical direction, the low pass filter may be used such that a delay in processing the second sensor data may occur. The delay incurred from using the low pass filter can be dependent upon a gain parameter used by the low pass filter to reduce noise in the second sensor data. For example, when the gain parameter is lower, the resulting delay may be lower.

A weighting function can be performed to dynamically control the gain parameter used by the low pass filter, such as to reduce the altitude delay time when possible. For example, the weighting function can include using an alternate low pass filter with a small (e.g., one second) window and measuring a difference between a current filter output and the small window output. If that difference increases, the window length of the current filter output can be reduced.

At 406, a position of the controller within a three-dimensional space is determined based on the filtered sensor data. Determining the position of the controller within the three-dimensional space includes combining portions of the filtered first sensor data and the filtered second sensor data to identify X-, Y-, and Z-axis coordinates of the controller within the three-dimensional space. For example, the X- and Y-axis coordinates can be identified based on the first sensor data produced using the GNSS-based sensor, and the Z-axis coordinate can be identified as the altitude of the controller determined by filtering the first sensor data and the second sensor data.

At 408, the position of the controller is transmitted to the UAV controlled using the controller. Transmitting the position of the controller can include transmitting packets in real-time to the UAV using a wireless connection between the controller and the UAV (e.g., Wi-Fi). A packet transmitted to the UAV may, for example, include a number of (e.g., 20) position samples per second. The transmission may, for example, be over the User Datagram Protocol (UDP).

In some implementations, the first sensor data and the second sensor data may be combined before the filtering. For example, the technique 400 can include operations for combining the sensor data produced at 402 before the sensor data are filtered at 404. In such an implementation, the filtering at 404 may include applying one or more filters to the combined first sensor data and second sensor data. The determining at 406 may then include identifying X-, Y-, and Z-axis coordinates representing the position of the controller within a three-dimensional space based on the filtered and combined first sensor data and second sensor data. Alternatively, the determining at 406 may then be omitted, such as where the combining results in the identification of the X-, Y-, and Z-axis coordinates representing the position of the controller within the three-dimensional space.

In some implementations, the filtering can be omitted where the sensor data produced at 402 satisfies a threshold. For example, one or more thresholds representative of vertical or horizontal position error can be specified to reflect a greatest acceptable error for the sensor data. In the event that either or both of the first sensor data or the second sensor data does not satisfy the one or more thresholds, the technique 400 can proceed to the filtering at 404 before determining the position of the controller at 406. However, in the event that both of the first sensor data and the second sensor data satisfy the one or more thresholds, the technique 400 can omit the filtering at 404 and proceed to the determining at 406.

In some implementations, the operations for determining the position of the controller at 406 can include processing multiple data values. For example, a first data value can be an altitude measurement of the filtered second sensor data. A second data value can reflect a difference between an altitude measurement of the filtered second sensor data and an altitude measurement of sensor data previously produced using the barometer of the controller. A third data value can reflect a difference between an altitude measurement of the filtered second sensor data and an altitude measurement of the filtered first sensor data. For example, the first data value can be processed along with the second and third data values using a complementary filter, such as by smoothing those three data values to determine a final altitude measurement for the controller. That final altitude measurement can be combined with latitudinal and longitudinal position data produced using the GNSS-based sensor to determine the position of the controller.

Figure 5:
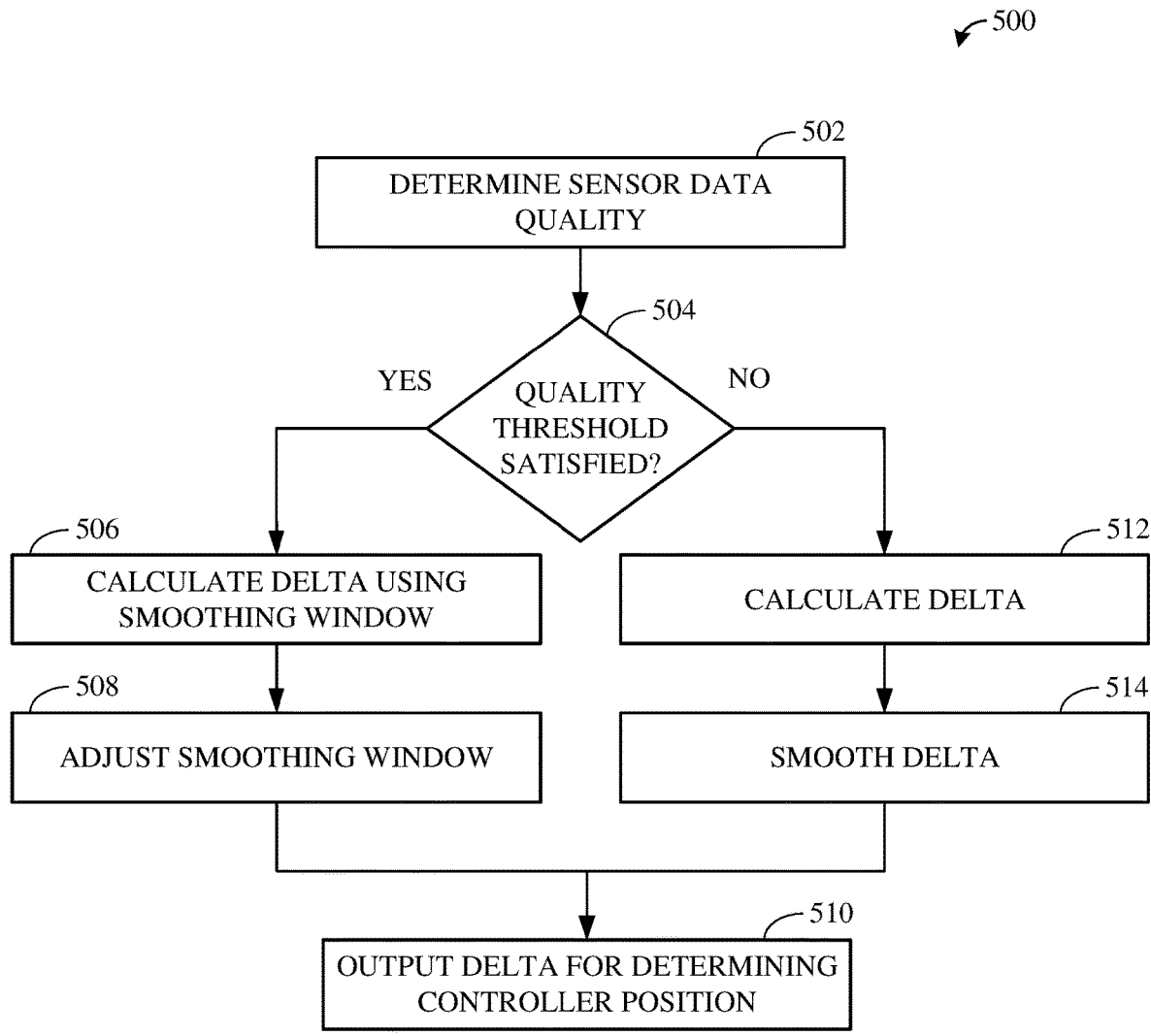
FIG. 5 is a flowchart showing an example of a technique for determining a position of a controller in a three-dimensional space.

FIG. 5 is a flowchart showing an example of a technique 500 for determining a position of a controller in a three-dimensional space. The technique 500 can be performed, for example, using hardware and/or software components of a controller of a UAV, such as the controller 300 shown in FIG. 3. For example, the operations performed at 406 in FIG. 4 for determining a position of a controller of a UAV can include the operations comprising the technique 500. For example, the operations comprising the technique 500 can be performed as part of a complementary filter for combining first sensor data produced using a GNSS-based sensor of the controller and second sensor data produced using a barometer of the controller. Alternatively, the technique 500 can be performed using hardware and/or software components of a UAV, such as the UAV 302 shown in FIG. 3. Although the technique 500 is described with respect to a series of operations, the operations comprising the technique 500 may be performed in orders other than those described herein. In some implementations, the technique 500 may include additional, fewer, or different operations than those described herein.

At 502, a sensor data quality is determined for sensor data produced using a sensor of a controller of a UAV. The sensor data associated with the sensor data quality can, for example, be first sensor data produced using a GNSS-based sensor of the controller. The sensor data quality is determined by executing instructions associated with the production of the sensor data. For example, instructions performed by a software module or like mechanism associated with the GNSS-based sensor can process the first sensor data to determine a sensor data quality. The sensor data quality may, for example, indicate a degree to which an altitude of the controller measured using the GNSS-based sensor is usable to determine the altitude of the controller. The sensor data quality can be represented as a value, range of values, parameter, or the like.

At 504, a determination is made as to whether a quality threshold is satisfied by the sensor data quality. For example, the sensor data quality may reflect an amount of time since the sensor data was produced. The quality threshold may reflect a maximum amount of time that the sensor data quality can reflect to be usable to determine the altitude of the controller. For example, the quality threshold can be two seconds, such that the quality threshold is satisfied where the sensor data quality is below the quality threshold (e.g., less than two seconds).

At 506, responsive to a determination at 504 that the sensor data quality satisfies the quality threshold, a delta value is calculated by applying a window function using a smoothing window. The delta value represents a difference between an altitude measurement of the first sensor data produced using the GNSS-based sensor of the controller and an altitude measurement of the second sensor data produced using the barometer of the controller. Calculating the delta value using the smoothing window can include smoothing values of sensor data produced over a particular period of time within using a window function to calculate a delta value based on the input values from the first sensor data and the second sensor data. Calculating the delta value using the smoothing window can also or instead include applying a low pass filter to smooth one or both of the first sensor data or the second sensor data prior to calculating the difference between the altitude measurements. Examples of applying a low pass filter to sensor data are described above with respect to FIG. 4.

At 508, the smoothing window used to calculate the delta value is adjusted. Adjusting the smoothing window can include temporally moving the window to focus on a different period of time than was previously used to calculate the delta value. For example, once the delta value is calculated, the smoothing window can be moved to a different period of time so that it may be used to determine a new delta for new sensor data to be produced later. Adjusting the smoothing window can also or instead include performing a weighting function against a gain value of the low pass filter used to calculate the delta value in order to dynamically control a gain parameter used by the low pass filter. At 510, the delta value calculated at 506 is output. For example, the delta value can be output from a complementary filter for use in determining a position of the controller in a three-dimensional space.

Alternatively, at 512, responsive to a determination at 504 that the sensor data quality does not satisfy the quality threshold, a delta value is calculated between the altitude measurement of the first sensor data and the altitude measurement of the second sensor data without using a smoothing window. For example, calculating the delta value at 512 can include calculating a difference between those altitude measurements. At 514, the delta value calculated at 512 is smoothed. Smoothing the delta value calculated at 512 can include processing that delta value using a low pass filter. After the delta value is smoothed at 514, the technique proceeds to 510, where the delta value smoothed at 514 is output, such as for use in determining a position of the controller in a three-dimensional space.

In some implementations, the determination at 504 can include comparing the sensor data quality determined at 502 to multiple thresholds. For example, the technique 500 can proceed to 506 when the sensor data quality satisfies a first threshold (e.g., by being less than a first threshold value, for example, two seconds), or the technique 500 can proceed to 512 when the sensor data quality satisfies a second threshold (e.g., by being greater than or equal to the first threshold value and less than a second threshold value, for example, ten seconds). In the event that the sensor data quality does not satisfy either of the first threshold or the second threshold, the technique 500 can terminate. In such a case, the sensor data processed by performing the technique 500 can be discarded or otherwise ignored.

In some implementations, the adjusting of the smoothing window at 508 can be omitted. In such an implementation, the delta value calculated using the smoothing window can be output for determining the position of the controller at 510 immediately following the calculation thereof at 506.

In some implementations, the technique 500 can include determining a status of the GNSS-based sensor of the controller. For example, responsive to determining that the quality threshold is satisfied at 504, the technique 500 can include determining whether the GNSS-based sensor is active, such that it is producing sensor data in real-time or not active, for example, because it has not produced sensor data in a threshold or otherwise configurable amount of time. If the GNSS-based sensor is determined to be active, the first sensor data produced using the GNSS-based sensor can be included within the smoothing window to calculate a delta value at 506. Otherwise, sensor data previously produced using the GNSS-based sensor can be included within the smoothing window instead of the first sensor data. In some implementations, the determination as to whether the quality threshold is satisfied at 504 can include a determination as to the status of the GNSS-based sensor of the controller.

Figure 6:
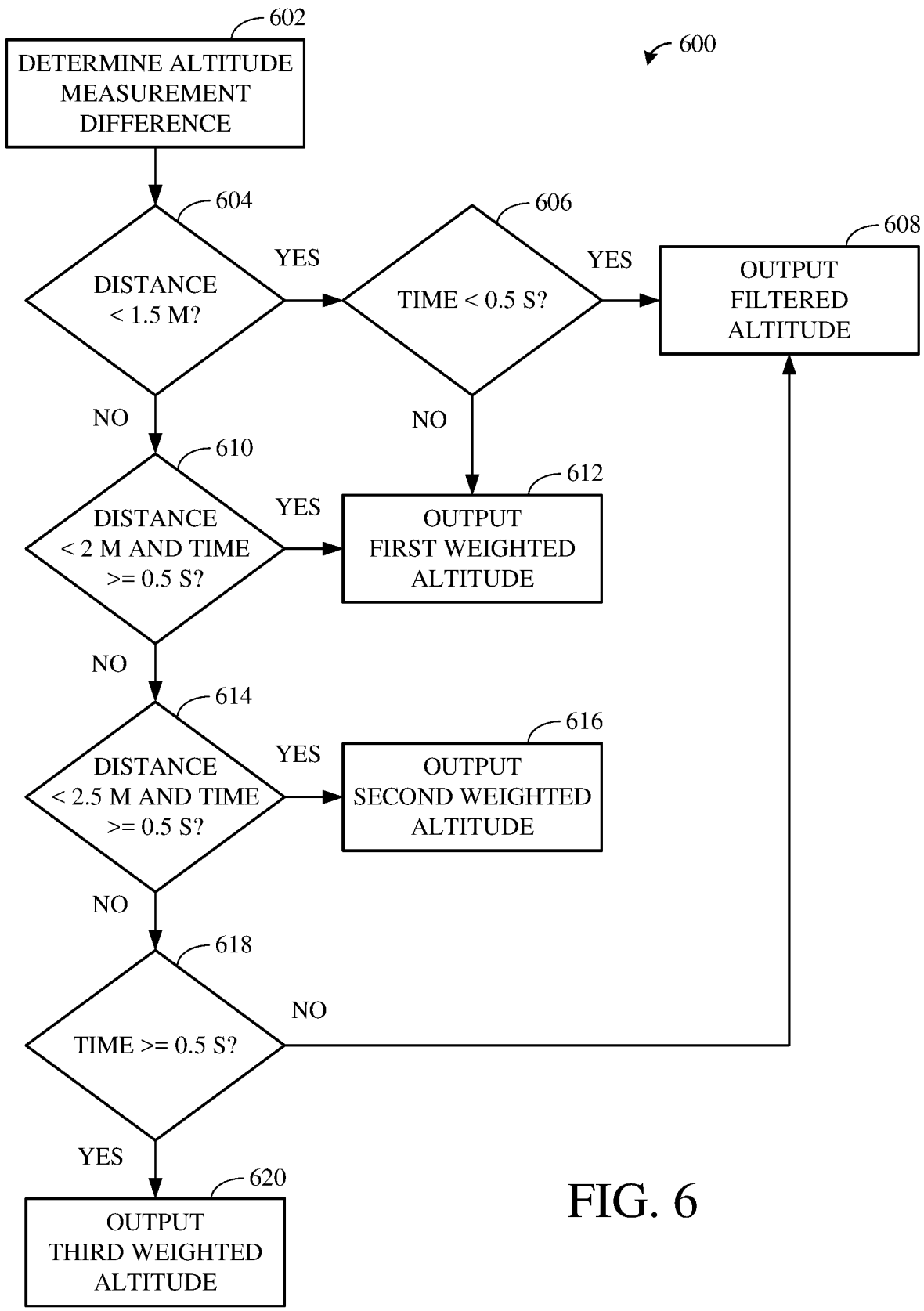
FIG. 6 is a flowchart showing an example of a technique for weighting an altitude measurement.

FIG. 6 is a flowchart showing an example of a technique 600 for weighting an altitude measurement. At 602, an altitude measurement difference is determined. For example, multiple windows can be used to determine whether and by how much to weight a delta value indicative of a controller altitude (e.g., the delta value output at 510 shown in FIG. 5). For example, a long window may be used to determine a first altitude measurement of the filtered second sensor data. In another example, a short window may be used to determine a second altitude measurement of the filtered second sensor data. The altitude measurement difference can thus be a difference between those first and second altitude measurements. Based on that altitude measurement difference, a determination can be made as to whether to output a delta value representing a difference between first sensor data and second sensor data (e.g., as calculated at 506 or smoothed at 514 in FIG. 5) or to instead weight that delta value based on the altitude measurement difference.

The altitude measurement difference may reflect one or both of a difference in time between when the first and second altitude measurements were produced or a difference in the values of the first and second altitude measurements. The operations comprising the technique 600 can be performed, for example, to adjust for movement of the controller caused by a user of the controller. As such, the technique 600 can be performed as part of or alongside the performance of the technique 500 shown in FIG. 5.

At 604, those operations can first include determining whether the difference between the first and second altitude measurements is less than a threshold distance (e.g., 1.5 meters). If it is, at 606, a second determination is made as to whether the difference between when the first and second altitude measurements were respectively produced is less than a threshold amount of time (e.g., 0.5 seconds). If it is, then, at 608, the delta value calculated at 506 or smoothed at 514 is output at 510.

However, if at 610 the difference between the first and second altitude measurements is determined to be between a first threshold distance and a second threshold distance (e.g., greater than or equal to 1.5 meters and less than 2 meters) or otherwise not less than the threshold amount of time (e.g., 0.5 seconds), then at 612 a first weighted altitude value is output at 510 instead of the delta value calculated at 506 or smoothed at 514. If at 614 the difference between the first and second altitude measurements is determined to instead be between the second threshold distance and a third threshold distance (e.g., greater than or equal to 2 meters and less than 2.5 meters) and greater than or equal to the threshold amount of time (e.g., 0.5 seconds), then at 616 a second weighted altitude value is output at 510 instead of the delta value calculated at 506 or smoothed at 514. If at 618 the difference between the first and second altitude measurements is greater than or equal to the third threshold distance (e.g., 2.5 meters) and/or determined to be not less than the threshold amount of time (e.g., 0.5 seconds), then at 620 a third weighted altitude value is output at 510 instead of the delta value calculated at 506 or smoothed at 514. Otherwise, the technique 600 returns to 608, where the delta value calculated at 506 or smoothed at 514 is output at 510.

Figure 7:
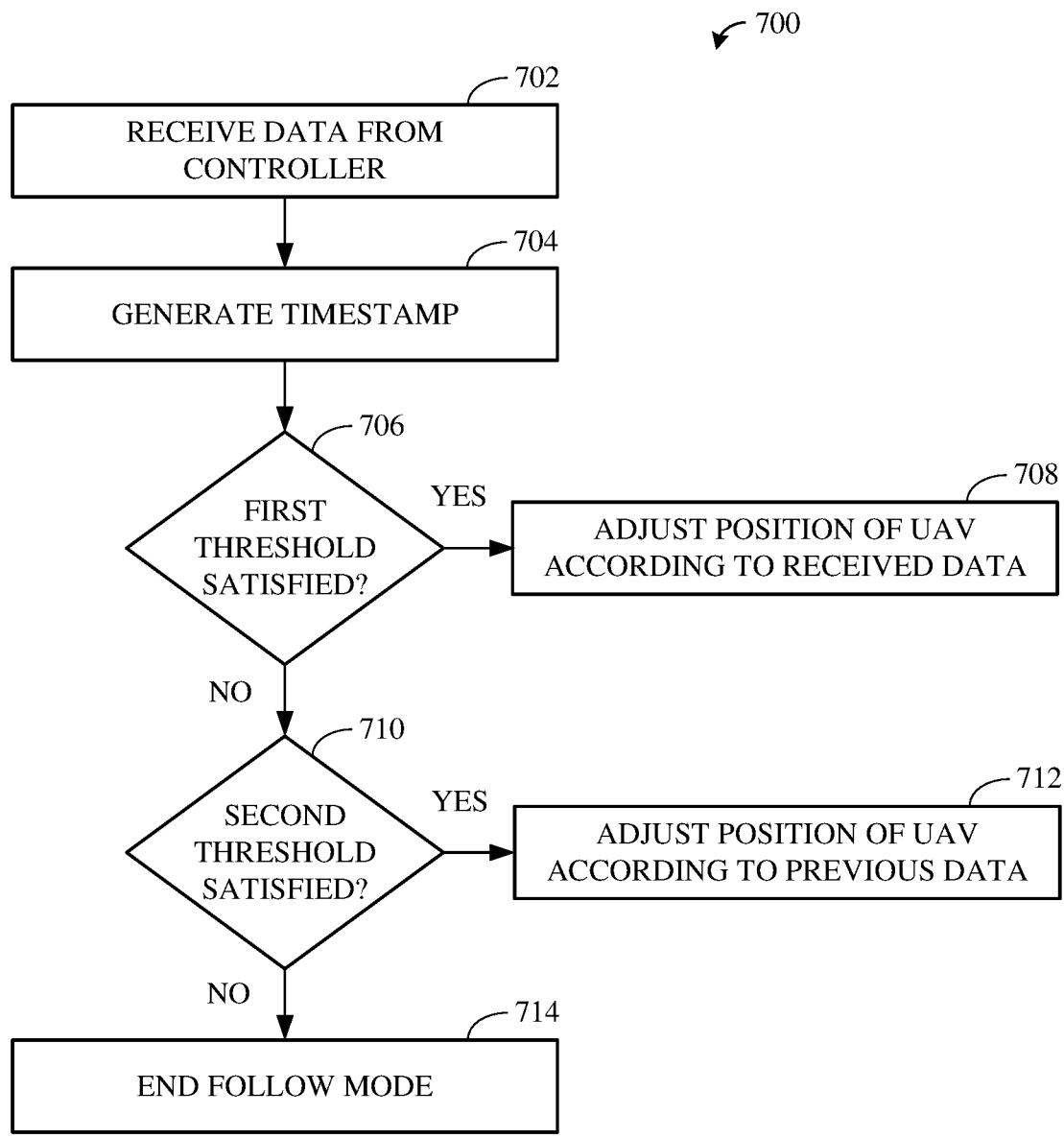
FIG. 7 is a flowchart showing another example of a technique for position-based control of a UAV performed at the UAV.

FIG. 7 is a flowchart showing an example of a technique 700 for position-based control of a UAV performed at the UAV. The technique 700 can be performed, for example, using hardware and/or software components of a UAV, such as the UAV 302 shown in FIG. 3. For example, the technique 700 may be performed in whole or in part using an adjustment mechanism of the UAV, such as the adjustment mechanism 316 shown in FIG. 3. Although the technique 700 is described with respect to a series of operations, the operations comprising the technique 700 may be performed in orders other than those described herein. In some implementations, the technique 700 may include additional, fewer, or different operations than those described herein.

At 702, the UAV receives data from a controller of the UAV. The data includes data indicative of a position of the controller within a three-dimensional space. The data can be received as or in a number of packets received in real-time from the controller over a wireless connection between the controller and the UAV (e.g., Wi-Fi). A packet received at the UAV may, for example, include a number of (e.g., 20) position samples per second. The transmission may, for example, be over UDP. At 704, a timestamp is generated. The timestamp reflects a time at which the data is received at the UAV from the controller.

At 706, a determination is made as to whether a first threshold is satisfied. For example, the first threshold can reflect a configurable maximum amount of time that may elapse between when the sensor data is produced at the controller and a time indicated by the timestamp generated at 704 for the data received at 702 to be used to adjust a position of the UAV. In the event that the amount of time so elapsed does not exceed the first threshold, and thus that the first threshold is satisfied, the technique 700 proceeds to 708, at which the position of the UAV is adjusted according to the data received at 702.

At 710, responsive to determining that the first threshold is not satisfied, a determination is made as to whether a second threshold is satisfied. For example, the second threshold can reflect a configurable maximum amount of time that may elapse between when the sensor data is produced at the controller and a time indicated by the timestamp generated at 704 for the UAV to remain in follow mode. In the event that the amount of time that has so elapsed does not exceed the second threshold, and thus that the second threshold is satisfied, the technique 700 proceeds to 712, at which the position of the UAV is adjusted according to sensor data previously received at the UAV from the controller. For example, a previously-received packet can be used to indicate the position of the controller instead of a packet received at 702.

Adjusting the position of the UAV at 708 or 712 includes executing instructions to cause the UAV to move from a first position to a second position. As will be described below, adjusting the position of the UAV at 708 or 712 may also include executing instructions to cause the UAV to change orientation, such as by pitch, yaw, or roll.

At 714, responsive to determining at 710 that the second threshold is not satisfied, a follow mode of the UAV is ended. Ending the follow mode can include terminating a follow operation being performed by the UAV. The follow mode of the UAV is ended when neither of the first threshold or the second threshold is satisfied. That is, the follow mode of the UAV may end, for example, because the accuracy of the position measurement of the controller or of the UAV is not usable to effectively measure the position of the controller or determine whether to adjust a position of the UAV.

In some implementations, the technique 700 can include determining that a subject is outside of a field of view of an imaging component of the UAV (e.g., the imaging device 104 shown in FIG. 1B) and adjusting an orientation of the UAV to cause the subject to be within the field of view. For example, the subject may be the controller. A field of view of the imaging component can be determined based on characteristics of the imaging component, such as a lens angle of the imaging component and a size of that lens. If the controller is not within a field of view of the imaging component of the UAV, the UAV can be adjusted, for example, by changing a pitch (e.g., a Gimbal pitch) of the UAV.

In some implementations, the operations for determining that a subject is outside of a field of view of an imaging component of the UAV and adjusting an orientation of the UAV to cause the subject to be within the field of view can be performed wholly or partially by a controller of the UAV. For example, the controller can detect a position and orientation (e.g., direction) of the imaging device and transmit data or instructions to cause the UAV to change position or orientation such that the camera is directed toward the controller.

In some implementations, the technique 700 can include causing the UAV to enter a configurable safety zone based on the data received from the controller. For example, the UAV may include functionality for determining that the data received from the controller does not accurately reflect a position of the controller (e.g., by comparing it against previous data received from the controller within a threshold period of time). For example, if newly received data indicates that the position of the controller has changed by 10 feet in half a second, the UAV can interpret this data to reflect an inaccurate position measurement. In such a case, the position of the UAV may not be adjusted based on the data received from the controller.

In some implementations, the operations for generating the timestamp and determining whether the first and second thresholds are satisfied at 704, 706, and 710 can be omitted. For example, the operations for determining whether the data indicative of the position of the controller is usable to adjust a position of the UAV can be wholly made at the controller instead of in part at the UAV. In some implementations, the operations for generating the timestamp and determining whether the first and second thresholds are satisfied at 704, 706, and 710 can be replaced with operations for determining a manner by which to adjust a position of the UAV based on the data received from the controller, such as based on determinations made at the controller (e.g., the operations described with respect to FIG. 5).

Figure 8:
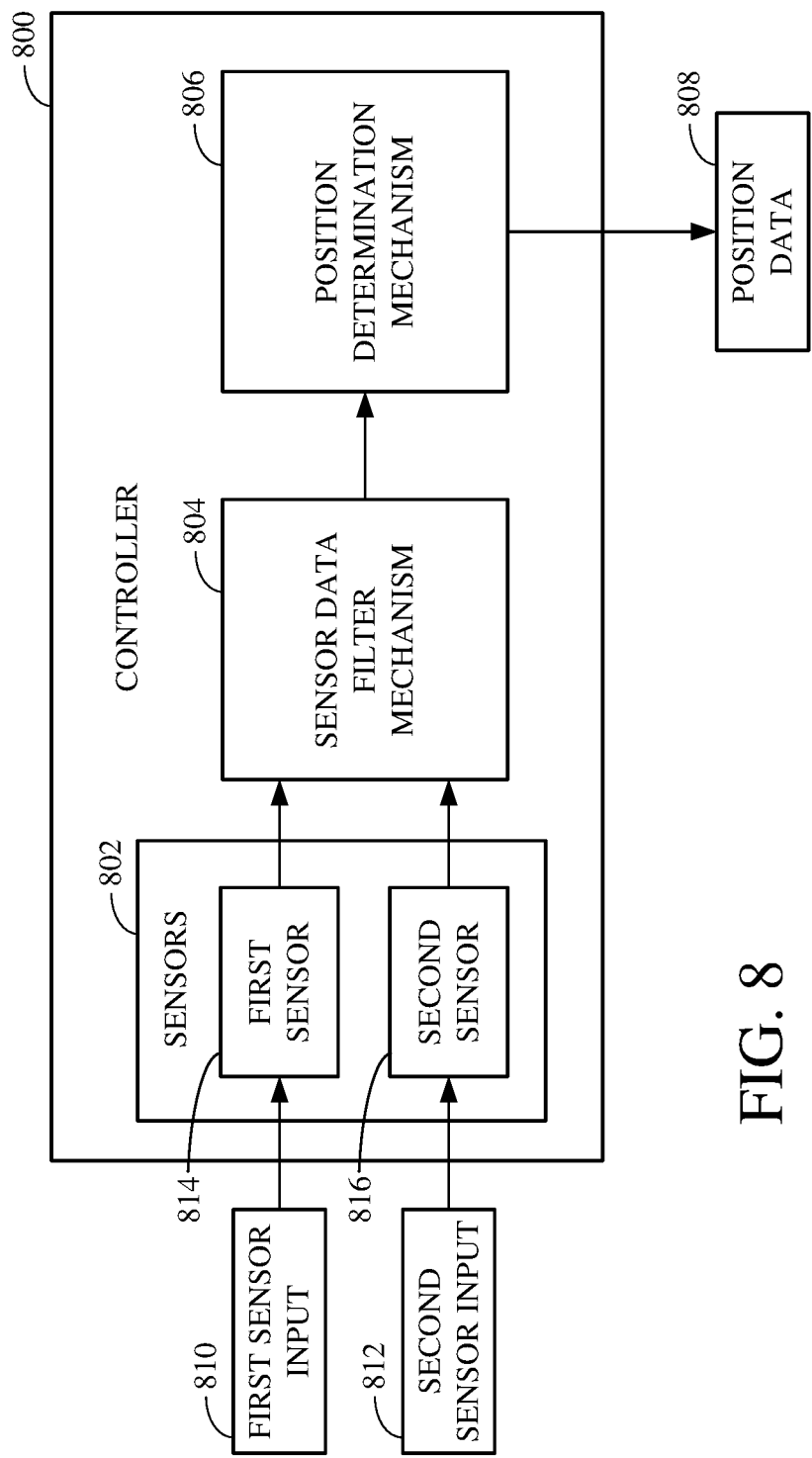
FIG. 8 is a block diagram illustrating an example of components of a controller of a UAV

FIG. 8 is a block diagram illustrating an example of components of a controller 800 of a UAV (e.g., the UAV 302 shown in FIG. 3). The controller 800 may, for example, be the controller 300 shown in FIG. 3. The controller 800 includes sensors 802, a sensor data filter mechanism 804, and a position determination mechanism 806. Data produced using ones of the sensors 802 are processed by the sensor data filter mechanism 804 and the position determination mechanism 806 to generate position data 808. The position data 808 reflects a position of the controller 800 within a three-dimensional space.

The controller 800 receives first sensor input 810 and second sensor input 812. The first sensor input 810 and the second sensor input 812 may reflect measurable aspects of an environment in which the controller 800 is located. For example, the first sensor input 810 can reflect a geolocation of the controller 800, and the second sensor input 812 can reflect a barometric pressure around the controller 800. The first sensor input 810 can be processed by a first sensor 814 of the sensors 802. The second sensor input 812 can be processed by a second sensor 816 of the sensors 802. For example, the first sensor 814 can be a GNSS-based sensor. In another example, the second sensor 816 can be a barometer. The first sensor 814 produces first sensor data based on the first sensor input 810. The second sensor 816 produces second sensor data based on the second sensor input 812.

The first sensor data and the second sensor data are processed by the sensor data filter mechanism 804 to filter the first sensor data and the second sensor data. For example, the sensor data filter mechanism 804 may include functionality for processing the first sensor data and/or the second sensor data using a Kalman filter, a low pass filter, a complementary filter, or the like, or a combination thereof. The sensor data filter mechanism 804 may, for example, include functionality for performing all or a portion of the operations at 404 in the technique 400 of FIG. 4 or all or a portion of the operations in the technique 500 of FIG. 5.

Subsequent to the filtering by the sensor data filter mechanism 804, the filtered first and second sensor data are processed by the position determination mechanism 806 to determine a position of the controller 800 within a three-dimensional space. For example, the position determination mechanism 806 can process altitude measurements of the first sensor data and the second sensor data to determine a final altitude measurement for the controller 800, which final altitude measurement reflects a change in altitude of the controller 800 such as from a last measured altitude of the controller 800. The position determination mechanism 806 may, for example, perform all or a portion of the operations at 406 in the technique 400 of FIG. 4 or all or a portion of the operations in the technique 500 of FIG. 5.

Implementations of the controller 800 may include additional, fewer, or different components than those shown in FIG. 8. In some implementations, the sensor data filter mechanism 804 and the position determination mechanism 806 may be combined into a single mechanism or other software module executable by a processor available to the controller 800. In some implementations, one or both of the sensor data filter mechanism 804 or the position determination mechanism 806 can use data stored in a buffer (not shown). For example, the data stored in the buffer of the controller 800 can include data previously produced using one or both of the first sensor 814 or the second sensor 816.

In some implementations, the controller 800 may include a signal processor (not shown) that causes the first sensor 814 and the second sensor 816 to respectively produce first sensor data and second sensor data based on the first sensor input 810 and the second sensor input 812. In some implementations, the controller 800 may include a communications mechanism or like component (not shown) that transmits the position data 808 to a UAV.

Where certain elements of these implementations may be partially or fully implemented using known components, those portions of such known components that are necessary for an understanding of the present disclosure have been described, and detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses presently existing and future known equivalents to the components referred to herein by way of illustration.

As used herein, the term "bus" is meant generally to denote any type of interconnection or communication architecture that may be used to communicate data between two or more entities. The "bus" could be optical, wireless, infrared, or another type of communication medium. The exact topology of the bus could be, for example, standard "bus," hierarchical bus, network-on-chip, address-event-representation (AER) connection, or other type of communication topology used for accessing, for example, different memories in a system.

As used herein, the terms "computer," "computing device," and "computerized device" include, but are not limited to, personal computers (PCs) and minicomputers (whether desktop, laptop, or otherwise), mainframe computers, workstations, servers, personal digital assistants (PDAs), handheld computers, embedded computers, programmable logic devices, personal communicators, tablet computers, portable navigation aids, Java 2 Platform, Micro Edition (J2ME) equipped devices, cellular telephones, smartphones, personal integrated communication or entertainment devices, or literally any other device capable of executing a set of instructions.

As used herein, the term "computer program" or "software" is meant to include any sequence of machine-cognizable operations which perform a function. Such a program may be rendered in virtually any programming language or environment including, for example, C/C++, C#, Fortran, COBOL, MATLAB™, PASCAL, Python, assembly language, markup languages (e.g., HTML, Standard Generalized Markup Language (SGML), XML, Voice Markup Language (VoxML)), as well as object-oriented environments such as the Common Object Request Broker Architecture (CORBA), Java™ (including J2ME, Java Beans), and/or Binary Runtime Environment (e.g., Binary Runtime Environment for Wireless (BREW)).

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data, including, without limitation, read-only memory (ROM), programmable ROM (PROM), electrically erasable PROM (EEPROM), dynamic random-access memory (DRAM), Mobile DRAM, synchronous DRAM (SDRAM), Double Data Rate 2 (DDR/2) SDRAM, extended data out (EDO)/fast page mode (FPM), reduced latency DRAM (RLDRAM), static RAM (SRAM), "flash" memory (e.g., NAND/NOR), memristor memory, and pseudo SRAM (PSRAM).

As used herein, the terms "microprocessor" and "digital processor" are meant generally to include digital processing devices. By way of non-limiting example, digital processing devices may include one or more of digital signal processors (DSPs), reduced instruction set computers (RISCs), general-purpose complex instruction set computing (CISC) processors, microprocessors, gate arrays (e.g., FPGAs), PLDs, RCFs, array processors, secure microprocessors, ASICs, and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variations), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or out-of-band, cable modem, and/or other radio frequency tuner protocol interfaces), Wi-Fi (802.11), WiMAX (802.16), personal area network (PAN) (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), High Speed Downlink Packet Access/High Speed Uplink Packet Access (HSDPA/HSUPA), Time Division Multiple Access (TDMA), Code Division Multiple Access (CDMA) (e.g., IS-95A, Wideband CDMA (WCDMA), and/or other wireless technology), Frequency Hopping Spread Spectrum (FHSS), Direct Sequence Spread Spectrum (DSSS), Global System for Mobile communications (GSM), PAN/802.15, WiMAX (802.16), 802.20, narrowband/Frequency Division Multiple Access (FDMA), Orthogonal Frequency Division Multiplex (OFDM), Personal Communication Service (PCS)/Digital Cellular System (DCS), LTE/LTE-Advanced (LTE-A)/Time Division LTE (TD-LTE), analog cellular, cellular Digital Packet Data (CDPD), satellite systems, millimeter wave or microwave systems, acoustic, infrared (i.e., IrDA), and/or other wireless interfaces.

As used herein, the term "robot" may be used to describe an autonomous device, autonomous vehicle, computer, artificial intelligence (AI) agent, surveillance system or device, control system or device, and/or other computerized device capable of autonomous operation.

As used herein, the terms "camera," or variations thereof, and "image capture device," or variations thereof, may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the technology are described in terms of a specific sequence of steps of a method, these descriptions are illustrative of the broader methods of the disclosure and may be modified by the particular application. Certain steps may be rendered unnecessary or optional under certain circumstances. Additionally, certain steps or functionality may be added to the disclosed implementations, or the order of performance of two or more steps may be permuted. All such variations are considered to be encompassed within the disclosure.

What is claimed is:

1. A method for controlling an unmanned aerial vehicle, the method comprising:
    determining first sensor data for a first sensor of a remote controller that is in communication with the unmanned aerial vehicle;
    determining second sensor data for a second sensor of the remote controller that is in communication with the unmanned aerial vehicle;
    applying a filter to the first sensor data and the second sensor data to provide filtered first sensor data and filtered second sensor data;
    processing the filtered first sensor data and the filtered second sensor data to generate processed sensor data;
    responsive to determining that the processed sensor data satisfies one or more thresholds, determining a delta value as a difference between a first altitude measurement and a second altitude measurement of the remote controller relative to an object;
    determining an altitude of the remote controller of the unmanned aerial vehicle relative to the object based on the delta value;
    determining a position of the remote controller within a three-dimensional space based on the processed sensor data and the altitude;
    determining an altitude of the unmanned aerial vehicle above the object;
    transmitting the position of the remote controller within the three-dimensional space to the unmanned aerial vehicle to cause a change in a position of the unmanned aerial vehicle within the three-dimensional space relative to the object;
    determining an amount of time that lapses between a signal leaving the remote controller and the signal arriving at the unmanned aerial vehicle;
    determining if the amount of time is within a threshold of time and controlling the unmanned aerial vehicle based on the signal if the amount of time is within the threshold of time;
    controlling the unmanned aerial vehicle to end a follow mode if the amount of time exceeds the threshold of time; and
    maintaining a fixed angle between the remote controller and the unmanned aerial vehicle.

2. The method of claim 1, wherein the one or more thresholds comprises a first threshold and a second threshold, wherein determining that the processed sensor data satisfies the one or more thresholds comprises:
    determining that the processed sensor data is less than the first threshold or that the processed sensor data is greater than the first threshold and less than the second threshold.

3. The method of claim 2, comprising:
    responsive to determining that the processed sensor data does not satisfy the first threshold or the second threshold, discarding the processed sensor data.

4. The method of claim 1, comprising:
    subsequent to determining the delta value as the difference between the first altitude measurement and the second altitude measurement, smoothing the delta value using a low pass filter.

5. The method of claim 1, wherein determining the delta value as the difference between the first altitude measurement and the second altitude measurement relative to the object comprises:
    determining the delta value by applying a smoothing window function against the first altitude measurement and the second altitude measurement to determine a moving window average for the first altitude measurement and the second altitude measurement; and
    subsequent to determining the delta value by applying the smoothing window function against the first altitude measurement and the second altitude measurement, adjusting a smoothing window corresponding to the smoothing window function.

6. The method of claim 1, wherein the first sensor data indicates a geolocation of the remote controller and the second sensor data indicates a barometric pressure of an environment in which the remote controller is located.

7. The method of claim 6, comprising:
    determining a barometric pressure difference between the first altitude measurement and the second altitude measurement using a low pass filter with a gain parameter, wherein the altitude of the remote controller is determined using the barometric pressure difference.

8. The method of claim 7, wherein the gain parameter is dynamically controlled by performing a weighting function based on a difference between the second altitude measurement and an altitude measurement of the first sensor data previously produced using the second sensor.

9. The method of claim 1, further comprising:
    determining the fixed angle relative to the altitude of the remote controller and the altitude of the unmanned aerial vehicle.

10. A system comprising:
    an unmanned aerial vehicle; and
    a remote controller in communication with the unmanned aerial vehicle, the remote controller comprising:
        a controller comprising:
            a first sensor that produces first sensor data based on a geolocation of the remote controller;
            a second sensor that produces second sensor data based on a barometric pressure of an environment in which the remote controller is located;
            a filter mechanism that filters a first altitude measurement of the first sensor data relative to an object and a second altitude measurement of the second sensor data relative to the object to generate filtered sensor data; and
            a position determination mechanism that generates position data, wherein the controller controls the unmanned aerial vehicle by:
                responsive to determining, with the filter mechanism, that the filtered sensor data satisfies a quality threshold, determining a delta value as a difference between the first altitude measurement and the second altitude measurement of the remote controller;
                determining an altitude of the remote controller based on the delta value;
                determining, with the position determining mechanism, a position of the remote controller within a three-dimensional space based on the first sensor data and the altitude;

determining an altitude of the unmanned aerial vehicle above the object;

transmitting the position of the remote controller within the three-dimensional space to the unmanned aerial vehicle to cause a change in a position of the unmanned aerial vehicle within the three-dimensional space relative to the object;

determine an amount of time that lapses between a signal leaving the remote controller and the signal arriving at the unmanned aerial vehicle;

determine if the amount of time is within a threshold of time and controlling the unmanned aerial vehicle based on the signal if the amount of time is within the threshold of time;

controlling the unmanned aerial vehicle to end a follow mode if the amount of time exceeds the threshold of time; and maintaining a fixed angle between the remote controller and the unmanned aerial vehicle.

11. The system of claim 10, wherein the first sensor data reflects a value measured using the first sensor that produced the first sensor data, and wherein the filter mechanism is a low pass filter that applies smoothing to the delta value.

12. The system of claim 10, wherein the first sensor data satisfies the quality threshold when the first sensor data is less than a first threshold value or less than a second threshold value.

13. The system of claim 10, wherein the filtered sensor data is generated by:

responsive to determining that the first sensor data does not satisfy the quality threshold, discarding the first sensor data.

14. The system of claim 10, wherein determining the delta value as the difference between the first altitude measurement and the second altitude measurement of the remote controller relative to the object, comprises:

determining the delta value by applying a smoothing window function against the first altitude measurement and the second altitude measurement to determine a moving window average for the first altitude measurement and the second altitude measurement.

15. The system of claim 10, wherein the filtered sensor data is generated by:

determining a barometric pressure difference between the second sensor data and sensor data previously produced by the second sensor that produced the second sensor data using a low pass filter with a gain parameter, wherein the altitude of the unmanned aerial vehicle is determined using the barometric pressure difference, wherein the gain parameter is dynamically controlled by performing a weighting function based on a difference between the second altitude measurement and an altitude measurement of the second sensor data previously produced using the second sensor that produced the second sensor data.

16. The system of claim 10, wherein the filter mechanism determines the fixed angle relative to the altitude of the remote controller and the altitude of the unmanned aerial vehicle.

17. A non-transitory computer-readable storage medium, comprising processor-executable routines that, when executed by a processor, facilitate a performance of operations for controlling an unmanned aerial vehicle, the operations comprising:

determining first sensor data of a remote controller of the unmanned aerial vehicle;

determining second sensor data of the remote controller of the unmanned aerial vehicle;

applying a filter to the first sensor data and the second sensor data to provide filtered first sensor data and filtered second sensor data;

processing the filtered first sensor data and the filtered second sensor data to generate a processed sensor data;

responsive to determining that the processed sensor data satisfies a quality threshold, determining a difference between a first altitude and a second altitude of the remote controller relative to an object;

determining an altitude of the remote controller of the unmanned aerial vehicle based on the difference;

determining a position of the remote controller based on the processed sensor data and the altitude;

determining an altitude of the unmanned aerial vehicle above the object;

transmitting the position of the remote controller within a three-dimensional space to the unmanned aerial vehicle to cause a change in a position of the unmanned aerial vehicle within the three-dimensional space relative to the object;

determining an amount of time that lapses between a signal leaving the remote controller and the signal arriving at the unmanned aerial vehicle;

determining if the amount of time is within a threshold of time and controlling the unmanned aerial vehicle based on the signal if the amount of time is within the threshold of time;

controlling the unmanned aerial vehicle to end a follow mode if the amount of time exceeds the threshold of time; and maintaining a fixed angle between the remote controller and the unmanned aerial vehicle.

18. The non-transitory computer-readable storage medium of claim 17, wherein the threshold comprises a first threshold and a second threshold, wherein determining that the first sensor data satisfies the quality threshold comprises:

determining that the first sensor data is less than the first threshold or that the first sensor data is greater than the first threshold and less than the second threshold.

19. The non-transitory computer-readable storage medium of claim 17, comprising:

subsequent to determining the difference between the first altitude and the second altitude, smoothing the difference using a low pass filter.

20. The non-transitory computer readable storage medium of claim 17, further comprising:

determining the fixed angle relative to the altitude of the remote controller and the altitude of the unmanned aerial vehicle.

* * * * *